(12) United States Patent
Osterholm

(10) Patent No.: US 10,159,237 B1
(45) Date of Patent: Dec. 25, 2018

(54) LINE DAMPENER

(71) Applicant: Charles D. Osterholm, Cocolalla, ID (US)

(72) Inventor: Charles D. Osterholm, Cocolalla, ID (US)

( * ) Notice: Subject to any disclaimer, the term of this patent is extended or adjusted under 35 U.S.C. 154(b) by 74 days.

(21) Appl. No.: 15/222,422

(22) Filed: Jul. 28, 2016

Related U.S. Application Data

(60) Provisional application No. 62/199,913, filed on Jul. 31, 2015.

(51) Int. Cl.
*A01K 91/06* (2006.01)
*A01K 93/00* (2006.01)

(52) U.S. Cl.
CPC .............. *A01K 91/06* (2013.01); *A01K 93/00* (2013.01)

(58) Field of Classification Search
CPC ................................ A01K 91/06; A01K 93/00
USPC ...................... 43/4, 42.72, 44.87, 44.9, 44.91
See application file for complete search history.

(56) References Cited

U.S. PATENT DOCUMENTS

| | | | | |
|---|---|---|---|---|
| 155,266 A * | 9/1874 | Sprague | ................ | A01K 91/10 43/15 |
| 738,923 A * | 9/1903 | Lewis | ................... | A01K 93/00 43/44.92 |
| 1,444,876 A * | 2/1923 | Hanson | ................... | F16G 15/08 403/165 |
| 2,729,015 A * | 1/1956 | Finnegan | ............... | A01K 93/00 43/44.9 |
| 2,731,758 A * | 1/1956 | Coe | ........................ | A01K 91/06 43/42.72 |
| 2,792,665 A * | 5/1957 | Brickler | ................. | A01K 93/00 43/44.87 |
| 2,834,142 A * | 5/1958 | Saye | ....................... | A01K 93/00 43/44.87 |
| 3,465,465 A * | 9/1969 | Kirkowski | ............ | A01K 95/00 43/17.2 |
| 4,748,763 A * | 6/1988 | Giraudo | ................. | A01K 97/24 43/17.2 |
| 4,924,620 A * | 5/1990 | Kimberley | ............. | A01K 97/02 43/44.9 |
| 5,231,787 A * | 8/1993 | Chuang | .................. | A01K 93/00 43/43.1 |
| 5,235,776 A * | 8/1993 | Backus | .................. | A01K 93/00 43/43.11 |
| 6,425,200 B1 * | 7/2002 | Bennis | ................... | A01K 93/00 43/44.87 |
| 7,322,147 B1 * | 1/2008 | Queen, Jr. | ............. | A01K 91/10 43/15 |

* cited by examiner

*Primary Examiner* — David J Parsley
(74) *Attorney, Agent, or Firm* — Plager Schack LLP; Mark H. Plager; Michael J. O'Brien

(57) ABSTRACT

A line dampener is configured to reduce vibration in a fishing line. The line dampener includes a housing that has a top portion that smoothly descends to a front portion, a rear portion, a port portion and a starboard portion. A bottom portion smoothly ascends to a front portion, a rear portion, a port portion and a starboard portion. A tunnel perforates the housing. A fishing line passes through the tunnel. The housing reduces the vibration in the fishing line.

2 Claims, 2 Drawing Sheets

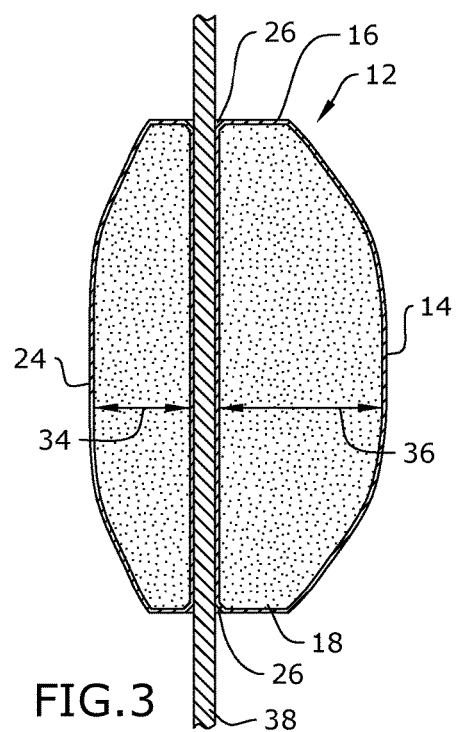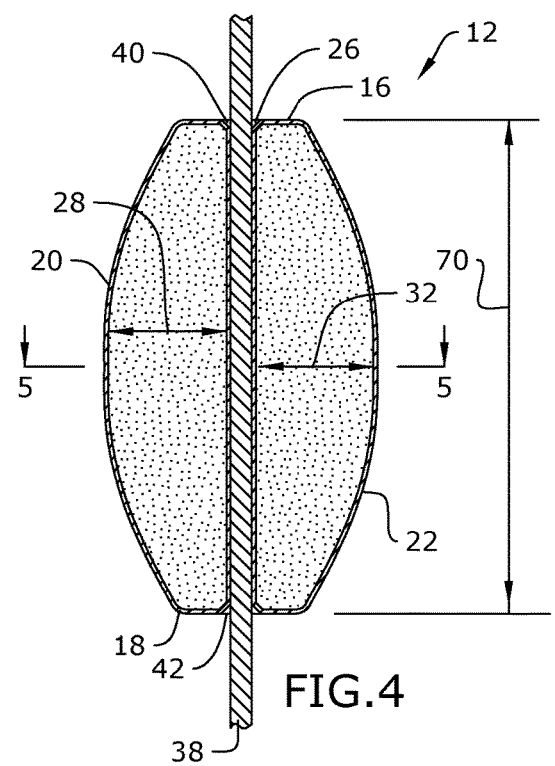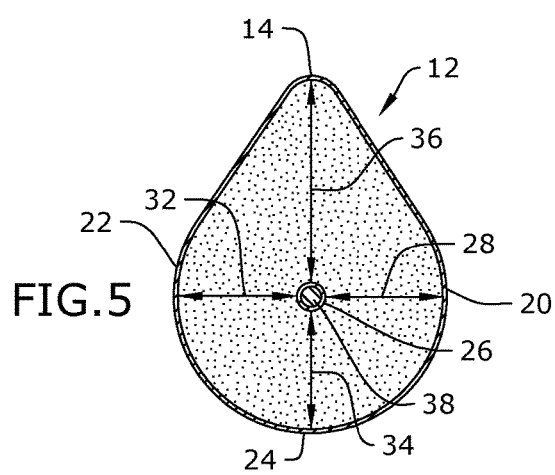

LINE DAMPENER

RELATED APPLICATION

This application claims priority to provisional patent application U.S. Ser. No. 62/199,913 filed on Jul. 31, 2015, the entire contents of which is herein incorporated by reference.

BACKGROUND

The embodiments herein relate generally to fishing tools and accessories.

Prior to embodiments of the disclosed invention, a downrigger cable on a fishing boat was subjected to negative oscillation. This caused vibration in the fishing line that discouraged fish from biting in bait or a lure. Embodiments of the disclosed invention solve this problem.

SUMMARY

A line dampener is configured to reduce vibration in a fishing line. The line dampener includes a housing that has a top portion that smoothly descends to a front portion, a rear portion, a port portion and a starboard portion. A bottom portion smoothly ascends to a front portion, a rear portion, a port portion and a starboard portion. A tunnel perforates the housing. A fishing line passes through the tunnel. The housing reduces the vibration in the fishing line.

BRIEF DESCRIPTION OF THE FIGURES

The detailed description of some embodiments of the invention is made below with reference to the accompanying figures, wherein like numerals represent corresponding parts of the figures.

FIG. 3 shows a section view of an embodiment of the present invention taken along line 3-3 in FIG. 2;

FIG. 4 shows a section view of an embodiment of the present invention taken along line 4-4 in FIG. 1; and FIG. 5 shows a section view of an embodiment of the present invention taken along line 5-5 in FIG. 4.

DETAILED DESCRIPTION OF CERTAIN EMBODIMENTS

Figure 1:
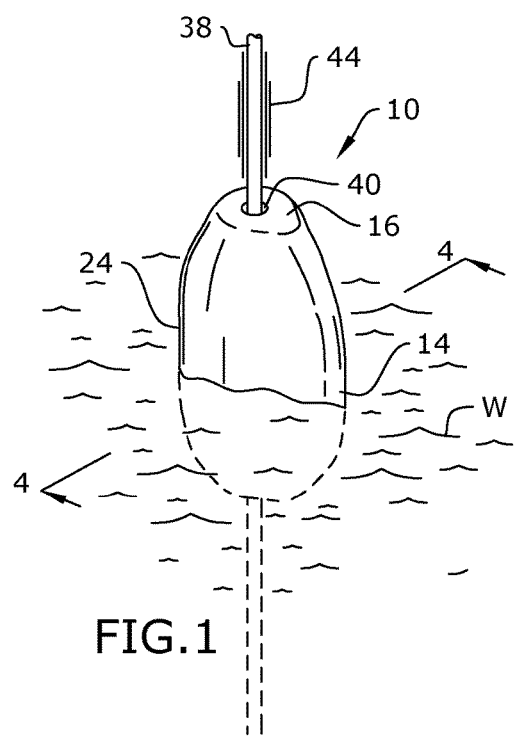
FIG. 1 shows a perspective view of one embodiment of the present invention shown in use.
Figure 2:
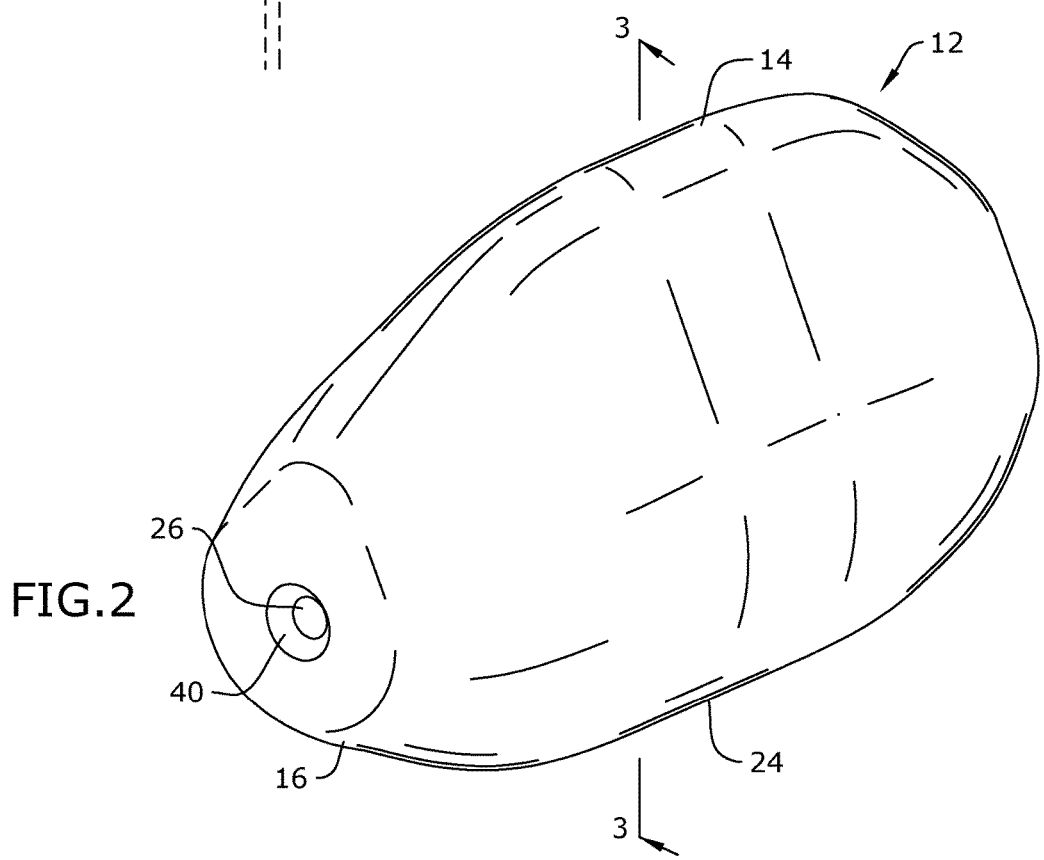
FIG. 2 shows a perspective view of one embodiment of the present invention.

By way of example, and referring to FIGS. 1-5, one embodiment of the line dampener 10 comprises housing 12. Housing 12 further comprises top portion 14. Top portion 14 smoothly descends to front portion 16, rear portion 18, port portion 20 and starboard portion 22. Bottom portion 24 smoothly ascends to front portion 16, rear portion 18, port portion 20 and starboard portion 22. Housing 12 is perforated with tunnel 26.

A first distance 28 exists between port portion 20 and tunnel 26 in a first plane shown in FIG. 4. The first distance 28 is variable proximate front portion 16 and rear portion 18, but constant between front portion 16 and rear portion 18 therefore, the first distance 28 is actually a first function of a channel distance 30.

A second distance 32 exists between starboard portion 22 and tunnel 26 in a second plane shown in FIG. 4. The second distance 32 is variable proximate front portion 16 and rear portion 18, but constant between front portion 16 and rear portion 18 therefore, the second distance 32 is actually a second function of the channel distance 30.

A third distance 34 exists between bottom portion 24 and tunnel 26 in the third plane shown in FIG. 3. The third distance 34 is variable proximate front portion 16 and rear portion 18, but constant between front portion 16 and rear portion 18 therefore, the third distance 34 is actually a third function of the channel distance 30.

A fourth distance 36 exists between top portion 14 and tunnel 26 in the fourth plane shown in FIG. 3. The fourth distance 36 is variable proximate front portion 16 and rear portion 18, but constant between front portion 16 and rear portion 18 therefore, the fourth distance 36 is actually a fourth function of the channel distance 30.

The second distance 32 equals the first distance 28 and the third distance 34 for all values of the channel distance 30. The fourth distance 36 is at least twice the second distance 32, the first distance 28, and the third distance 34. The first plane and the second plane are orthogonal to the third plane and the fourth plane.

Line 38 can be inserted through tunnel 26. Tunnel 26 further comprises tunnel front opening 40 and tunnel rear opening 42 that deviate slightly from the shapes described above.

In operation, line 38 is pulled through the water, and displays line vibration 44. If line vibration 44 travels beneath water W then line vibration 44 upsets fish. Line dampener 10 operates to prevent that from occurring. If not designed properly, the dampener would actually create more vibration or have some other effect that is deleterious to catching fish. That problem is solved with the dimensioning specified above.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶6.

In particular, any use of "step of" in the claims is not intended to invoke the provision of 35 U.S.C. § 112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A line dampener, configured to reduce vibration in a fishing line; the line dampener comprising:
   a housing further comprising:
   a top portion that smoothly descends to a front portion, a rear portion, a port portion and a starboard portion;
   a bottom portion that smoothly ascends to a front portion, a rear portion, a port portion and a starboard portion
   a tunnel, perforating the housing; and having a tunnel length measured from a tunnel opening to a tunnel exit;
   a fishing line, passing through the tunnel; wherein the housing reduces the vibration in the fishing line;
   a first distance, measured from the port portion to the tunnel in a first plane; wherein the first distance is variable proximate the front portion and the rear portion; wherein the first distance is a first function of a channel length;
   a second distance, measured from the starboard portion to the tunnel in a second plane, perpendicular to the first plane; wherein the second distance is variable proximate the front portion and the rear portion; wherein the second distance is a second function of the channel length;
   a third distance, measured from the bottom portion and to the tunnel in a third plane, perpendicular to the first plane and the second plane; wherein the third distance is variable proximate the front portion and the rear portion; wherein the third distance is a third function of the channel length;
   a fourth distance, measured from the top portion and the tunnel in a fourth plane; wherein the fourth distance is variable proximate the front portion and the rear portion; wherein the fourth distance is a fourth function of the channel distance;
   wherein the first plane and the second plane are orthogonal to the third plane and the fourth plane;
   wherein the fourth distance is at least twice the third distance for all values of the channel distance.

2. The line dampener of claim 1, wherein the second distance equals the first distance and the third function for all values of the channel distance.

* * * * *